US012278039B2

(12) United States Patent
Jeong

(10) Patent No.: US 12,278,039 B2
(45) Date of Patent: Apr. 15, 2025

(54) COIL ELECTRONIC COMPONENT AND METHOD OF MANUFACTURING SAME

(71) Applicant: SAMSUNG ELECTRO-MECHANICS CO., LTD., Suwon-si (KR)

(72) Inventor: Dong Jin Jeong, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 157 days.

(21) Appl. No.: 18/083,749

(22) Filed: Dec. 19, 2022

(65) Prior Publication Data

US 2023/0118574 A1 Apr. 20, 2023

Related U.S. Application Data

(63) Continuation of application No. 16/922,335, filed on Jul. 7, 2020, now Pat. No. 11,562,848, which is a
(Continued)

(30) Foreign Application Priority Data

Aug. 7, 2015 (KR) ........................ 10-2015-0111460

(51) Int. Cl.
*H01F 27/32* (2006.01)
*H01F 27/255* (2006.01)
(Continued)

(52) U.S. Cl.
CPC ....... *H01F 27/2804* (2013.01); *H01F 27/255* (2013.01); *H01F 27/29* (2013.01);
(Continued)

(58) Field of Classification Search
CPC .... H01F 27/2804; H01F 27/255; H01F 27/29; H01F 27/323; H01F 2017/0073; H01F 27/324
See application file for complete search history.

(56) References Cited

U.S. PATENT DOCUMENTS 6,466,401 B1 * 10/2002 Hong .................... G11B 5/313 360/123.25
2002/0101683 A1 8/2002 Kayakura
(Continued)

FOREIGN PATENT DOCUMENTS

JP 2003-051414 A 2/2003
JP 2005-235814 A 9/2005
(Continued)

OTHER PUBLICATIONS

Office Action issued on May 29, 2017 in the corresponding Korean Patent Application No. 10-2015-0111460 (With English translation).
(Continued)

*Primary Examiner* — Mang Tin Bik Lian
(74) *Attorney, Agent, or Firm* — Morgan, Lewis & Bockius LLP

(57) ABSTRACT

A coil electronic component includes a magnetic body having an internal coil part embedded therein, in which the internal coil part includes an insulating substrate, a first insulator, a coil conductor, and a second insulator. The first insulator is disposed on at least one of first and second main surfaces of the insulating substrate and has a groove formed therein. The coil conductor is formed inside the groove. The second insulator encloses the insulating substrate, the first insulator, and the coil conductor. The first insulator may be formed to a thickness larger than (and no more than 40 μm thicker than) a thickness of the coil conductor on the insulating substrate. The first insulator may be formed to a
(Continued)

width of 3 μm to 50 μm. Further, the second insulator may extend to a thickness 1 μm to 20 μm larger than that of the first insulator on the insulating substrate.

21 Claims, 4 Drawing Sheets

Related U.S. Application Data continuation of application No. 15/955,464, filed on Apr. 17, 2018, now Pat. No. 10,734,155, which is a continuation of application No. 15/098,938, filed on Apr. 14, 2016, now Pat. No. 9,978,501.

(51) Int. Cl.
*H01F 27/28* (2006.01)
*H01F 27/29* (2006.01)
*H01F 41/02* (2006.01)
*H01F 41/04* (2006.01)

(52) U.S. Cl.
CPC ....... *H01F 27/323* (2013.01); *H01F 41/0233* (2013.01); *H01F 41/042* (2013.01)

(56) References Cited

U.S. PATENT DOCUMENTS

| | | | | |
|---|---|---|---|---|
| 2003/0151849 | A1* | 8/2003 | Sasaki | G11B 5/3136 360/123.28 |
| 2012/0249279 | A1 | 10/2012 | Itou et al. | |
| 2013/0111101 | A1 | 5/2013 | Yoon | |
| 2013/0222101 | A1 | 8/2013 | Ito et al. | |
| 2013/0249664 | A1* | 9/2013 | Tonoyama | H01F 17/0013 336/200 |
| 2014/0009254 | A1* | 1/2014 | Ohkubo | H01F 17/0033 336/192 |
| 2014/0022041 | A1 | 1/2014 | Park et al. | |
| 2015/0035634 | A1* | 2/2015 | Nakamura | H01F 41/046 336/170 |
| 2015/0035640 | A1* | 2/2015 | Wang | H01F 41/042 336/200 |
| 2015/0109088 | A1 | 4/2015 | Kim et al. | |
| 2015/0255206 | A1 | 9/2015 | Han et al. | |
| 2016/0351316 | A1* | 12/2016 | Ohkubo | H01F 27/325 |

FOREIGN PATENT DOCUMENTS

| | | |
|---|---|---|
| JP | 2015-082660 A | 4/2015 |
| KR | 10-2014-0011693 A | 1/2014 |

OTHER PUBLICATIONS

Non-Final Office Action issued in U.S. Appl. No. 15/098,938, dated Aug. 4, 2017.
Notice of Allowance issued in U.S. Appl. No. 15/098,938, dated Jan. 24, 2018.
Non-Final Office Action issued in U.S. Appl. No. 15/955,464, dated Nov. 22, 2019.
Notice of Allowance issued in U.S. Appl. No. 15/955,464, dated Mar. 26, 2020.

* cited by examiner

COIL ELECTRONIC COMPONENT AND METHOD OF MANUFACTURING SAME

CROSS-REFERENCE TO RELATED APPLICATION

This application is the continuation application of U.S. patent application Ser. No. 16/922,335 filed on Jul. 7, 2020, which is a continuation of U.S. application Ser. No. 15/955,464, filed Apr. 17, 2018, which is a continuation of U.S. application Ser. No. 15/098,938, filed Apr. 14, 2016, which claims the priority and benefit of Korean Patent Application No. 10-2015-0111460, filed on Aug. 7, 2015 with the Korean Intellectual Property Office, the entire disclosure of which are incorporated herein reference.

BACKGROUND

The present disclosure relates to a coil electronic component and a method of manufacturing the same.

An inductor, such as a coil electronic component, is a passive circuit element that is commonly used in electronic circuits together with a resistor and a capacitor to remove noise.

A thin film type inductor is manufactured by forming a coil conductor by plating, hardening a magnetic powder-resin composite in which magnetic powder and a resin are mixed with each other to manufacture a magnetic body, and forming external electrodes on outer surfaces of the magnetic body.

As devices have become more complicated, multifunctionalized, slimmed, or the like in recent years, attempts to miniaturize thin film type inductors have been conducted. However, when a compact thin film type inductor is manufactured, a volume of the magnetic material which determines characteristics of the inductor may be decreased. Additionally, the miniaturization imposes a limit to increasing a line width or a thickness of the coil, thereby leading to characteristic degradations. Therefore, a method of providing a miniaturized inductor that does not suffer from characteristic degradations is needed in the art.

SUMMARY

An aspect of the present disclosure may provide a coil electronic component having excellent product characteristics and being easily miniaturized, and a method of manufacturing the same.

An aspect of the present disclosure may propose a new structure of a coil electronic component having an advantage in miniaturization and excellent reliability, and more specifically, according to an aspect of the present disclosure, a coil electronic component has a structure including a first insulator that has a groove formed therein and a coil conductor is formed inside the groove.

According to one aspect of the disclosure, a coil electronic component includes a magnetic body having an internal coil part embedded therein. The internal coil part includes an insulating substrate, a first insulator is disposed on at least one of first and second main surfaces of the insulating substrate and has a groove formed therein, a coil conductor is disposed inside the groove, and a second insulator encloses the insulating substrate, the first insulator, and the coil conductor.

According to another aspect of the disclosure, a method of manufacturing a coil electronic component includes forming a first insulator having a groove formed therein on at least one of first and second main surfaces of an insulating substrate. A coil conductor is formed in a groove of the first insulator. An internal coil part is formed by forming a second insulator enclosing the insulating substrate, the first insulator, and the coil conductor. In turn, a magnetic body is formed by stacking magnetic sheets on upper and lower portions of the internal coil part formed with the second insulator.

According to a further aspect of the disclosure, a method of manufacturing a coil electronic component includes forming a through hole extending through a central portion of an insulating substrate from a first main surface to a second main surface of the insulating substrate. A first insulator is formed in a spiral pattern around the through hole on at least one of the first and second main surfaces of the insulating substrate. A conductor is formed between adjacent windings of the first insulator formed in the spiral pattern to form a coil conductor. In turn, a second insulator is formed to fully enclose the insulating substrate, the first insulator, and the coil conductor.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
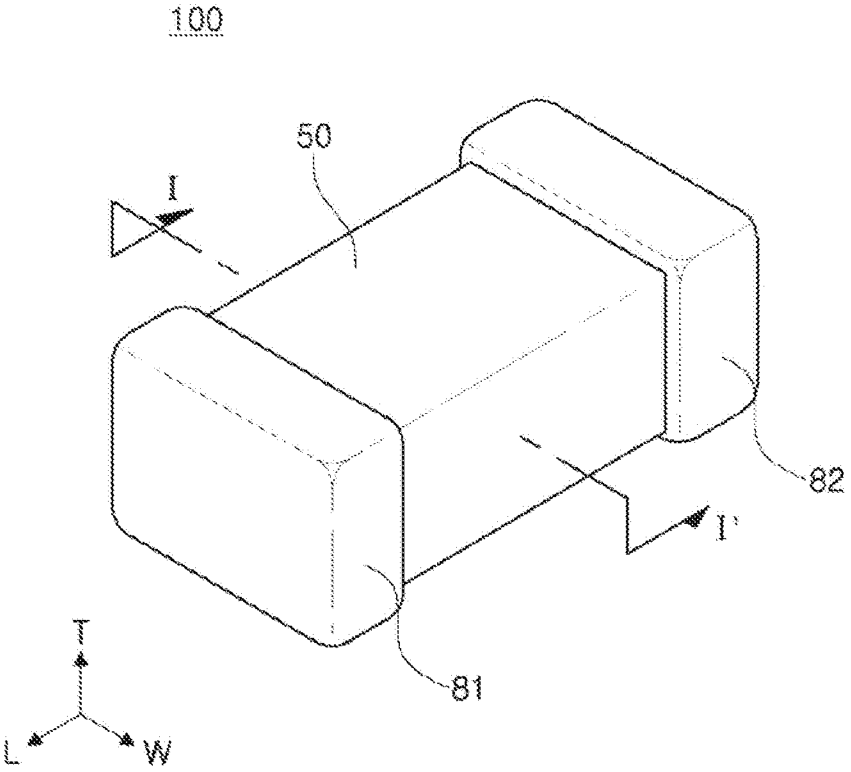
FIG. 1 is a perspective view of a coil electronic component according to an exemplary embodiment.

Hereinafter, embodiments of the present inventive concept will be described as follows with reference to the attached drawings.

The present inventive concepts may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another member, component, region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's positional relationship relative to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" relative to other elements would then be oriented "below," or "lower" relative to the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein is for describing particular embodiments only and is not intended to be limiting of the present inventive concepts. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups, but do not preclude the presence or addition of one or more other features, integers, steps, operations, members, elements, and/or groups.

Hereinafter, embodiments of the present inventive concepts will be described with reference to schematic views illustrating embodiments of the present inventive concepts. In the drawings, for example due to manufacturing techniques and/or tolerances, modifications of the shape shown may be estimated. Thus, embodiments of the present inventive concepts should not be construed as being limited to the particular shapes of regions shown herein, but should more generally be interpreted as including, for example, a change in shape resulting from a manufacturing process. The following embodiments may also be constituted by one or a combination thereof.

The contents of the present inventive concepts described below may have a variety of configurations, and only illustrative configurations are shown and described herein. The inventive concepts should not be interpreted as being limited to those illustrative configurations.

Coil Electronic Component

Hereinafter, a coil electronic component according to an exemplary embodiment is described, and more particularly, a thin film type inductor will be described as an example. However, the coil electronic component according to the exemplary embodiment is not limited thereto.

Figure 2:
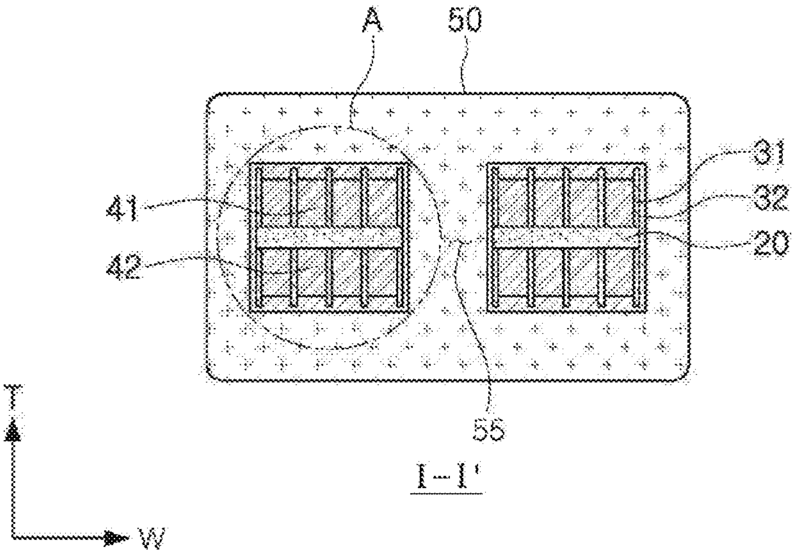
FIG. 2 is a cross-sectional view of the coil electronic component taken along line I-I' of FIG. 1.
Figure 3:
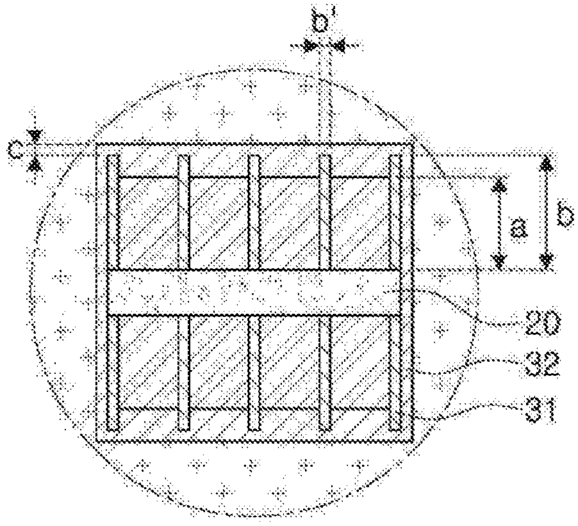
FIG. 3 is an enlarged view of part A of FIG. 2.

FIG. 1 is a perspective view of a coil electronic component according to an exemplary embodiment, FIG. 2 is a cross-sectional view of the coil electronic component taken along line I-I' of FIG. 1, and FIG. 3 is an enlarged view of part A of FIG. 2.

Based on FIG. 1, in the following description, a 'length' direction may be defined as an 'L' direction, a 'width' direction may be defined as a 'W' direction, and a 'thickness' direction may be defined as a 'T' direction in FIG. 1.

Referring to FIGS. 1 to 3, a coil electronic component 100 according to an exemplary embodiment includes a magnetic body 50 in which an internal coil part is embedded.

The magnetic body 50 may form an exterior of the coil electronic component 100. The magnetic body 50 may be formed of ferrite powder or magnetic metal powder exhibiting magnetic characteristics that is dispersed in thermosetting resins such as epoxy and polyimide. However, the magnetic body 50 is not limited thereto.

In the exemplary embodiment, the ferrite powder may be one or more selected from the group consisting of Mn—Zn based ferrite powder, Ni—Zn based ferrite powder, Ni—Zn—Cu based ferrite powder, Mn—Mg based ferrite powder, Ba based ferrite powder, and Li based ferrite powder. Further, the magnetic metal powder may contain one or more selected from the group consisting of Fe, Si, Cr, Al, and Ni. For example, the magnetic metal powder may be an Fe—Si—B—Cr based amorphous metal, but is not limited thereto.

Referring to FIGS. 2 and 3, the internal coil part which is embedded in the magnetic body 50 of the coil electronic component according to the exemplary embodiment may include an insulating substrate 20, first and second insulators 31 and 32, and coil conductors 41 and 42.

The insulating substrate 20 may be, for example, a polypropylene glycol (PPG) substrate, a ferrite substrate, a soft metal magnetic substrate, or the like. A central portion of the insulating substrate 20 may be formed with a through hole. The through hole may be filled with a magnetic material to form a core part 55. As such, the core part 55 filled with the magnetic material may be formed to better improve performance of a thin film type inductor.

The first insulator 31 may be formed on at least one of first and second main surfaces of the insulating substrate 20 (e.g., on upper and lower surfaces of the insulating substrate 20 in the particular orientation shown in FIGS. 2 and 3), and may have one or more grooves formed therein to form the coil conductors 41 and 42. The groove(s) may have a spiral shape, but are not limited thereto.

The first insulator 31 may contain one or more selected from the group consisting of epoxy, polyimide, and liquid crystalline polymer (LCP), but is not limited thereto.

The coil conductors 41 and 42 may be formed in the groove(s), and may be formed to contain metals having excellent electrical conductivity. For example, the coil conductors 41 and 42 may be formed of silver (Ag), palladium (Pd), aluminum (Al), nickel (Ni), titanium (Ti), gold (Au), copper (Cu), platinum (Pt), alloys thereof, or the like.

As an example of a preferred method of manufacturing coil conductors 41 and 42 in a thin film shape, an electroplating method may be used. However, the method of manufacturing coil conductors 41 and 42 in a thin film shape is not limited thereto, and therefore other methods known in the art may also be used as long as they may show similar effects.

Meanwhile, a direct current (DC) resistance Rdc, which is one of the main characteristics of the inductor, is decreased as a cross-sectional area of the coil conductor is increased. Further, inductance, which is another of the main characteristics of the inductor, may be increased as an area of the magnetic material through which a magnetic flux passes is increased. Therefore, in order to decrease the DC resistance (Rdc) and increase the inductance, the cross-sectional area of the coil conductor can be increased and the area of the magnetic material (such as the magnetic material forming the core part 55) can also be increased, for example by increasing a line width or a thickness of the coil conductor.

However, when electroplating is used to form the coil conductor, there may be a limit to increasing the cross-sectional area of the coil conductor.

That is, by increasing the line width of the coil conductor, the number of turns of the coil conductor which may be implemented may be limited (or reduced), and the area of the magnetic material may thereby be decrease. Thus, efficiency may be decreased, and there may be a limit of implementing high-capacity products. Further, by increasing the thickness of the coil conductor, the probability of occurrence of a short-circuit connection between adjacent coil conductors is increased due to isotropic growth. In detail, the isotropic growth may simultaneously achieve growth in a thickness direction and in a width direction of the coil conductor with the progress of plating, and thus there is a limit to reducing the DC resistance (Rdc).

Therefore, according to an exemplary embodiment, the coil conductors 41 and 42 are formed in the groove(s) formed inside the first insulator 31, and thus the first insulator 31 may serve as a plating growth guide. In this case, a shape of the coil conductors 41 and 42 may be easily controlled, and an overgrowth of an outermost coil may be suppressed, and thus the problem of characteristic degradations may be solved.

When a difference in the thickness of the first insulator 31 and the coil conductors 41 and 42 is excessively small, a short-circuit connection may occur between adjacent coil conductors or windings of a coil conductor. Conversely, when the difference in the thickness of the first insulator 31 and the coil conductors 41 and 42 is excessively large, the capacity may be decreased due to the decrease in the area of the magnetic material. Therefore, as a non-limited example, when the thickness of the first insulator 31 is b and the thickness of the coil conductors 41 and 42 is a, b−a may be selected so as to satisfy the following Equation (1).

$$0\ \mu m < b-a \leq 40\ \mu m \qquad \text{Equation (1)}$$

Similarly, when the width of the first insulator 31 is excessively small, a short-circuit connection is likely to occur between the adjacent coil conductors. However, when the width of the first insulator 31 is excessively large, the capacity is likely to be decreased due to the decrease in the area of the magnetic material. Therefore, as a non-limited example, when the width of the first insulator 31 is b', b' may be selected so as to satisfy the following Equation (2).

$$3\ \mu m \leq b' \leq 50\ \mu m \qquad \text{Equation (2)}$$

The second insulator 32 may coat the insulating substrate 20, the first insulator 31, and the coil conductors 41 and 42 and serve to secure the insulation between the coil and the magnetic material.

The second insulator 32 may contain one or more selected from the group consisting of epoxy, polyimide, and liquid crystalline polymer (LCP), but is not limited thereto.

When the thickness of the second insulator 32 is excessively thin, the insulation between the coil and the magnetic material is likely to be insufficiently secured, but when the thickness of the second insulator 32 is excessively thick, the capacity is likely to be decreased due to the decrease in the area of the magnetic material. Therefore, as a non-limited example, when the thickness of the second insulator is c, c may be selected so as to satisfy the following Equation (3).

$$1\ \mu m \leq c \leq 20\ \mu m \qquad \text{Equation (3)}$$

The coil electronic component 100 according to the exemplary embodiment may further include external electrodes 81 and 82 disposed on outer surfaces of the magnetic body 50 and electrically connected to the coil conductors 41 and 42.

The external electrodes 81 and 82 may be formed of metals having excellent electrical conductivity, such as nickel (Ni), copper (Cu), tin (Sn), silver (Ag), or alloys thereof.

A plating layer (not illustrated) may be formed on the external electrodes 81 and 82. In this case, the plating layer may contain one or more selected from the group consisting of nickel (Ni), copper (Cu), and tin (Sn). For example, a nickel (Ni) layer and a tin (Sn) layer may be sequentially formed on the plating layer.

Method of Manufacturing Coil Electronic Component

An example of a method of manufacturing a coil electronic component 100 having the foregoing structure will be described below.

FIGS. 4A through 4D are diagrams illustrating sequential steps of a method of manufacturing a coil electronic component according to an exemplary embodiment.

Figure 4A:
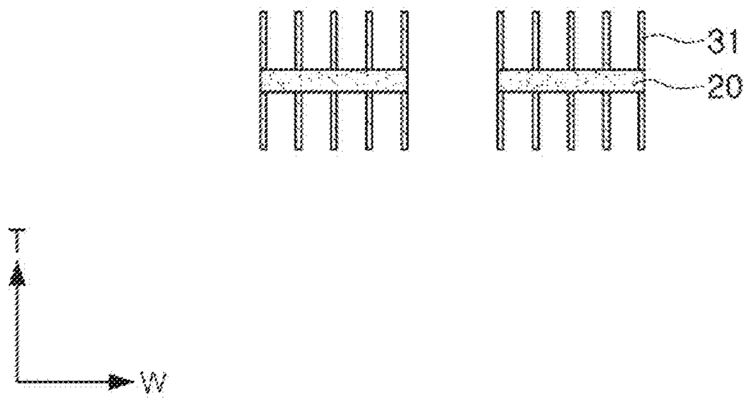
FIGS. 4A through 4D are diagrams illustrating sequential steps of a method of manufacturing a coil electronic component according to an exemplary embodiment.

First, referring to FIG. 4A, the first insulator 31 having the groove formed therein may be formed on at least one of the first and second main surfaces of the insulating substrate 20. For example, as shown in FIG. 4A, the first insulator 31 can be formed on both the first and second main surfaces of the insulating substrate 20, and a groove may be formed in the first insulator 31 disposed on each main surface of the insulating substrate 20. Meanwhile, prior to forming the first insulator 31, a via hole (not illustrated) may be formed in the insulating substrate 20 and may extend through the insulating substrate 20. In this case, the via hole (not illustrated) may be formed in a region other than a region in which the first insulator 31 is formed. The via hole may extend from the groove formed in the first main surface of the insulating substrate 20 to the grove formed in the second main surface of the insulating substrate 20.

Further, a through hole for forming the core part 55 may be formed at a central region of the insulating substrate 20 by a method such as a mechanical drilling method, a laser drilling method, sandblasting, and punching machining. The through hole may extend from the first main surface to the second main surface of the insulating substrate, and may be filled with a magnetic material while magnetic sheets to be described below are stacked, compressed, and hardened to form the core part 55 as shown in FIG. 4D.

According to the exemplary embodiment, the method of forming a first insulator 31 having a groove formed therein is not particularly limited. For example, the first insulator may be compressed to the polypropylene glycol (PPG) substrate and then may have a predetermined pattern formed therein by exposure and development, but is not limited thereto. In one example, the first insulator 31 is formed in a spiral pattern centered on the insulating substrate and surrounding the through hole, and the surface of the insulating substrate is exposed between adjacent windings of the spiral pattern of the first insulator 31.

Figure 4B:
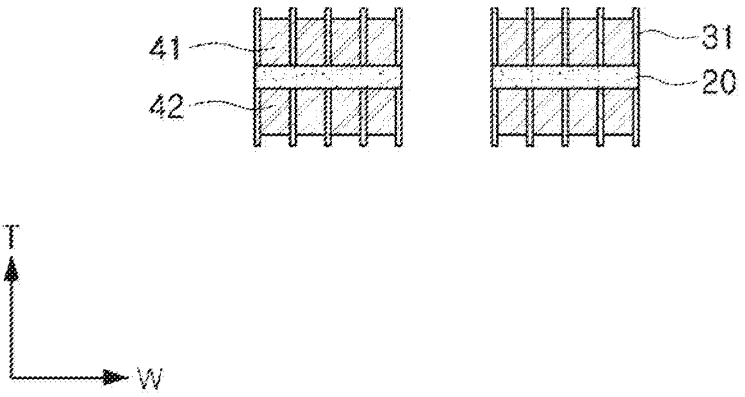

Next, referring to FIG. 4B, the coil conductors 41 and 42 may be formed inside the groove of the first insulator 31. For example, the coil conductor 41 may be formed inside the groove formed on the first main surface of the insulating substrate 20, while the coil conductor 42 may be formed inside the groove formed on the second main surface of the insulating substrate 20. The coil conductors 41 and 42 may be formed by the electroplating method. In examples in which the insulating substrate 20 is exposed between adjacent windings of the spiral pattern of the first insulator 31, the coil conductor(s) 41 and 42 are formed directly on a main surface of the insulating substrate 20. The coil conductors 41 and 42 and a via (not illustrated) connecting therebetween may be formed by filing a conductive metal by the plating. The coil conductors 41 and 42 may thus be electrically connected to each other by the via formed in the via hole that extends through the insulating substrate 20.

The coil conductors 41 and 42 and the via (not illustrated) may be formed of conductive metals having excellent electrical conductivity, such as silver (Ag), palladium (Pd), aluminum (Al), nickel (Ni), titanium (Ti), gold (Au), copper (Cu), platinum (Pt), alloys thereof, or the like.

However, the method of forming coil conductors 41 and 42 is not limited to the plating method, and therefore the coil part may also be formed of a metal wire. More generally, any coil conductors 41 and 42 may be applied as long as they are formed inside the body and they generate a magnetic flux when a current is applied.

Figure 4C:
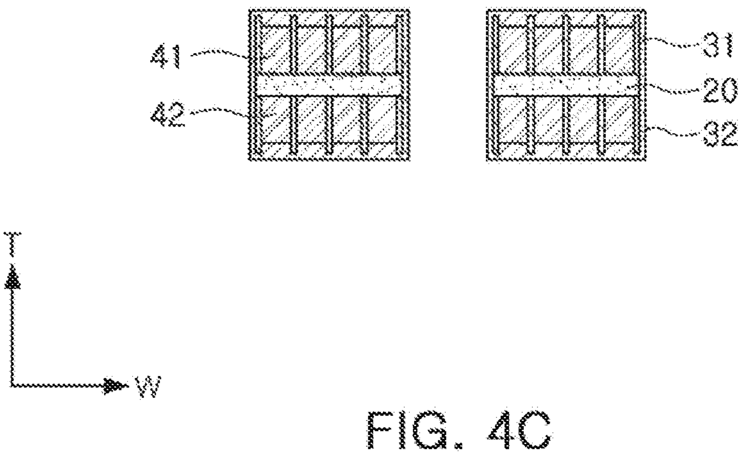
Figure 4D:
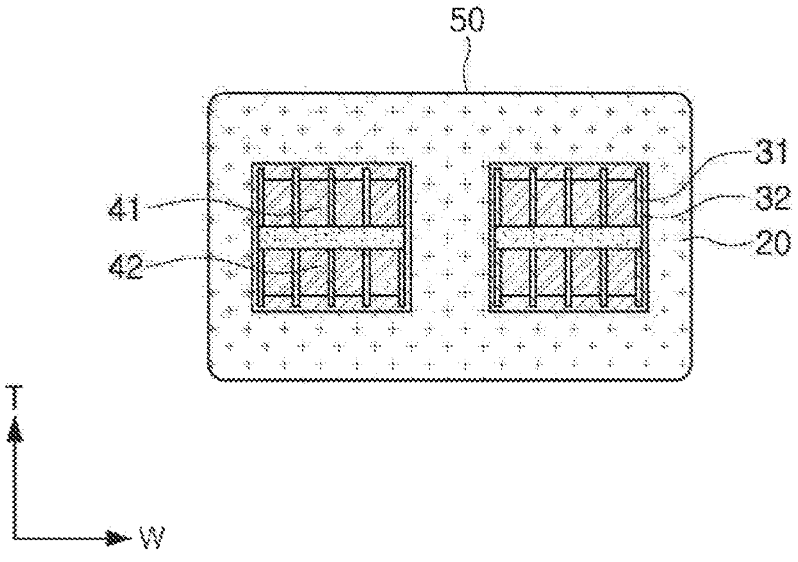

Next, referring to FIG. 4C, the second conductor 32 may be formed thereupon to enclose the insulating substrate 20, the first insulator 31, and the coil conductors 41 and 42 to form the internal coil part.

The second insulator 32 may be formed by a screen printing method, a method of exposure and development of photo resist (PR), a spray coating method, an oxidation method by chemical etching, or the like of a coil conductor.

Next, referring to FIG. 4D, one or more magnetic sheet(s) containing the magnetic metal powder and the thermosetting resin may be stacked on upper and lower portions of the internal coil part and compressed and hardened to form the magnetic body 50 in which the internal coil part is embedded.

The magnetic sheet(s) may be manufactured in a sheet shape by mixing organic matter such as the magnetic metal powder, a thermosetting resin, a binder, and a solvent, to prepare a slurry, applying the slurry onto a carrier film at a thickness of tens of micrometers by a doctor blade method, and drying the slurry.

Next, the external electrodes 81 and 82 electrically connected to the coil conductors 41 and 42 may be formed on the outer surfaces of the magnetic body 50. The external electrodes 81 and 82 may be formed of a paste containing the metals having excellent electrical conductivity, and the paste may be, for example, a conductive paste containing nickel (Ni), copper (Cu), tin (Sn), or silver (Ag) alone, alloys thereof, or the like. Further, the plating layer (not illustrated) may be further formed on the external electrodes 81 and 82. In this case, the plating layer may contain one or more selected from the group consisting of nickel (Ni), copper (Cu), and tin (Sn). For example, a nickel (Ni) layer and a tin (Sn) layer may be sequentially formed on the plating layer.

A description of features overlapping those of the electronic component 100 according to the exemplary embodiment described above except for the above-mentioned description will herein be omitted.

As set forth above, according to the exemplary embodiments, the coil electronic component may have excellent product characteristics and facilitate the miniaturization of products.

However, the useful advantages and effects of the present disclosure are not limited to the foregoing contents, but may be more easily understood during the explanation of the detailed exemplary embodiments.

While exemplary embodiments have been shown and described above, it will be apparent to those skilled in the art that modifications and variations could be made without departing from the spirit and scope of the present disclosure as defined by the appended claims.

What is claimed is:

1. A coil electronic component including a magnetic body having an internal coil part embedded therein, wherein the internal coil part includes:
- an insulating substrate;
- a first insulator disposed on at least one of first and second main surfaces of the insulating substrate and having a groove formed therein;
- a coil conductor disposed inside the groove; and
- a second insulator,
- wherein the second insulator covers an upper surface of the coil conductor, inner lateral surfaces of the first insulator defining the groove, and a lateral surface of the first and second main surfaces of the insulating substrate,
- wherein a sum of a thickness of the coil conductor measured in a direction orthogonal to the at least one of the first and second main surfaces of the insulating substrate and a thickness of the second insulator in the direction orthogonal to the at least one of the first and second main surfaces of the insulating substrate is substantially equal to a thickness of the first insulator measured in the direction orthogonal to the at least one of the first and second main surfaces of the insulating substrate,
- a portion of the second insulator is in contact with the magnetic body in which the insulating substrate is disposed, the portion of the second insulator is disposed between the magnetic body and an innermost lateral surface of the first insulator in the direction orthogonal to the at least one of the first and second main surfaces of the insulating substrate.

2. The coil electronic component of claim 1, wherein 0 μm<b−a≤40 μm in which b is a thickness of the first insulator measured in the direction orthogonal to the at least one of the first and second main surfaces of the insulating substrate and a is a thickness of the coil conductor measured in the direction orthogonal to the at least one of the first and second main surfaces of the insulating substrate.

3. The coil electronic component of claim 1, wherein 3 μm≤b'≤50 μm in which b' is a width of the first insulator measured in a direction parallel to the at least one of the first and second main surfaces of the insulating substrate.

4. The coil electronic component of claim 1, wherein 1 μm≤c≤20 μm in which c is a thickness of the second insulator in the direction orthogonal to the at least one of the first and second main surfaces of the insulating substrate.

5. The coil electronic component of claim 1, wherein the first and second insulators contain one or more selected from the group consisting of epoxy, polyimide, and liquid crystalline polymer (LCP).

6. The coil electronic component of claim 1, wherein the magnetic body contains magnetic metal powder and a thermosetting resin.

7. The coil electronic component of claim 1, further comprising:
- an external electrode disposed on an outer surface of the magnetic body and electrically connected to the coil conductor.

8. The coil electronic component of claim 1, wherein the groove is a spiral shaped groove, and the coil conductor disposed inside the groove is spiral shaped.

9. The coil electronic component of claim 8, wherein 3 μm≤b'≤50 μm in which b' is a width of the first insulator measured between adjacent windings of the spiral shaped groove.

10. The coil electronic component of claim 1, wherein:
- the first insulator is disposed on both the first and second main surfaces of the insulating substrate and has a groove formed therein on each of the first and second main surfaces of the insulating substrate;

the coil conductor is disposed inside the groove on each of the first and second main surfaces of the insulating substrate;

the insulating substrate includes a via hole extending therethrough from the first main surface to the second main surface and disposed at a location other than a location in which the first insulator is disposed; and the coil electronic component further comprises a via extending through the via hole to interconnect the coil conductor disposed inside the groove on the first main surface of the insulating substrate to the coil conductor disposed inside the groove on the second main surfaces of the insulating substrate.

11. A coil electronic component comprising:

a magnetic body;

an insulating substrate disposed in the magnetic body;

a first insulator disposed on at least one surface of the insulating substrate and having a groove therein;

a coil conductor disposed inside the groove; and a second insulator disposed on an upper surface of the first insulator, an upper surface of the coil, and a lateral surface of the first and second main surfaces of the insulating substrate, wherein the first insulator includes innermost and outermost lateral surfaces perpendicular to the one surface of the insulating substrate, a portion of the second insulator is in contact with the magnetic body in which the insulating substrate is disposed, the portion of the second insulator is disposed between the magnetic body and an innermost lateral surface of the first insulator in a direction orthogonal to the at least one of the first and second main surfaces of the insulating substrate, the coil conductor is in contact with the second insulator, and the upper surface of the coil conductor contacting the second insulator is located closer to the insulating substrate than the upper surface of the first insulator.

12. The coil electronic component of claim 11, wherein:

the entirety of the upper surface of the coil conductor is in contact with the second insulator.

13. The coil electronic component of claim 11, wherein $0\ \mu m < b-a \leq 40\ \mu m$ in which b is a thickness of the first insulator measured in the direction orthogonal to the at least one of the first and second main surfaces of the insulating substrate and a is a thickness of the coil conductor measured in the direction orthogonal to the at least one of the first and second main surfaces of the insulating substrate.

14. The coil electronic component of claim 11, wherein $3\ \mu m \leq b' \leq 50\ \mu m$ in which b' is a width of the first insulator measured in a direction parallel to the at least one of the first and second main surfaces of the insulating substrate.

15. The coil electronic component of claim 11, wherein $1\ \mu m \leq c \leq 20\ \mu m$ in which c is a thickness of the second insulator in the direction orthogonal to the at least one of the first and second main surfaces of the insulating substrate.

16. The coil electronic component of claim 11, wherein the first and second insulators contain one or more selected from the group consisting of epoxy, polyimide, and liquid crystalline polymer (LCP).

17. The coil electronic component of claim 11, wherein the magnetic body contains magnetic metal powder and a thermosetting resin.

18. The coil electronic component of claim 11, further comprising:

an external electrode disposed on an outer surface of the magnetic body and electrically connected to the coil conductor.

19. The coil electronic component of claim 11, wherein the groove is a spiral shaped groove, and the coil conductor disposed inside the groove is spiral shaped.

20. The coil electronic component of claim 19, wherein $3\ \mu m \leq b' \leq 50\ \mu m$ in which b' is a width of the first insulator measured between adjacent windings of the spiral shaped groove.

21. The coil electronic component of claim 11, wherein:

the first insulator is disposed on both the first and second main surfaces of the insulating substrate and has a groove formed therein on each of the first and second main surfaces of the insulating substrate;

the coil conductor is disposed inside the groove on each of the first and second main surfaces of the insulating substrate;

the insulating substrate includes a via hole extending therethrough from the first main surface to the second main surface and disposed at a location other than a location in which the first insulator is disposed; and the coil electronic component further comprises a via extending through the via hole to interconnect the coil conductor disposed inside the groove on the first main surface of the insulating substrate to the coil conductor disposed inside the groove on the second main surfaces of the insulating substrate.

* * * * *